US00RE42172E

(19) United States
(12) Reissued Patent
Trombly

(10) Patent Number: US RE42,172 E
(45) Date of Reissued Patent: Mar. 1, 2011

(54) TRAVEL MUG

(75) Inventor: Edgar F. Trombly, Birmingham, MI (US)

(73) Assignee: Punch Products, USA, Inc., Rahway, NJ (US)

(21) Appl. No.: 29/291,367

(22) Filed: Aug. 24, 2007

Related U.S. Patent Documents

Reissue of:
(64) Patent No.: Des. 512,269
Issued: Dec. 6, 2005
Appl. No.: 29/203,252
Filed: Apr. 12, 2004

(51) LOC (9) Cl. ..... 07-01
(52) U.S. Cl. ..... D7/523; D7/532; D7/533
(58) Field of Classification Search ..... D7/509–512, D7/533, 536, 523, 396.6, 532; D11/152; 215/12.2, 396, 398; 229/400, 402; 206/519; 220/703, 669, 713, 719, 710.5, 715
See application file for complete search history.

(56) References Cited

U.S. PATENT DOCUMENTS

| | | | | | |
|---|---|---|---|---|---|
| 3,471,075 | A | * | 10/1969 | Wolf | 229/400 |
| D231,068 | S | * | 4/1974 | Douglas | D7/533 |
| D381,558 | S | * | 7/1997 | Schaefer et al. | D7/531 |
| D429,959 | S | * | 8/2000 | Otake | D7/510 |
| D433,876 | S | * | 11/2000 | Freed | D7/532 |
| D434,275 | S | * | 11/2000 | Ginuntoli et al. | D7/533 |
| D457,389 | S | * | 5/2002 | Snell | D7/396.6 |
| RE37,773 | E | * | 7/2002 | Trombley | D7/511 |
| D462,578 | S | * | 9/2002 | Janky | D7/533 |
| D467,124 | S | * | 12/2002 | Janky | D7/533 |
| D472,101 | S | * | 3/2003 | Janky | D7/532 |
| D472,425 | S | * | 4/2003 | Hurlbut et al. | D7/510 |
| D479,671 | S | * | 9/2003 | Gluck | D7/533 |
| D480,919 | S | * | 10/2003 | Bin | D7/533 |
| D483,226 | S | * | 12/2003 | Belton et al. | D7/533 |
| D483,615 | S | * | 12/2003 | Norris et al. | D7/533 |
| D486,697 | S | * | 2/2004 | Copeland | D7/536 |
| D511,072 | S | * | 11/2005 | Trombly | D7/533 |
| D535,524 | S | * | 1/2007 | Kramer | D7/533 |
| D542,599 | S | * | 5/2007 | Tien | D7/523 |
| D546,125 | S | * | 7/2007 | Bhavnani | D7/523 |
| D569,188 | S | * | 5/2008 | Tornqvist | D7/523 |
| D571,151 | S | * | 6/2008 | Lopez | D7/510 |
| D599,622 | S | * | 9/2009 | Gilbert et al. | D7/538 |
| D606,364 | S | * | 12/2009 | Gilbert et al. | D7/510 |

* cited by examiner

*Primary Examiner*—Marianne Pandozzi
(74) *Attorney, Agent, or Firm*—Jones Day

(57) CLAIM

The ornamental design for a travel mug, as shown and described.

DESCRIPTION

FIG. 1 is a perspective view of a travel mug according to the present invention;
FIG. 2 is a left side view thereof;
FIG. 3 is a right side view thereof;
FIG. 4 is a top view thereof;
FIG. 5 is a bottom view thereof;
FIG. 6 is a rear view thereof;
FIG. 7 is a front view thereof;
FIG. 8 is a perspective view of [an alternate embodiment of the present invention] *a travel mug showing a second embodiment of my new design*;
FIG. 9 is a left side view thereof;
FIG. 10 is a right side view thereof;
FIG. 11 is a top view thereof;
FIG. 12 is a bottom view thereof;
FIG. 13 is a rear view thereof; and,
FIG. 14 is a front view thereof.
*All broken lines in the above figures are for illustrative purposes only and form no part of the claimed design.*

1 Claim, 12 Drawing Sheets

Matter enclosed in heavy brackets [ ] appears in the original patent, but forms no part of this reissue; matter printed in italics indicates the additions made by reissue.

AMENDED

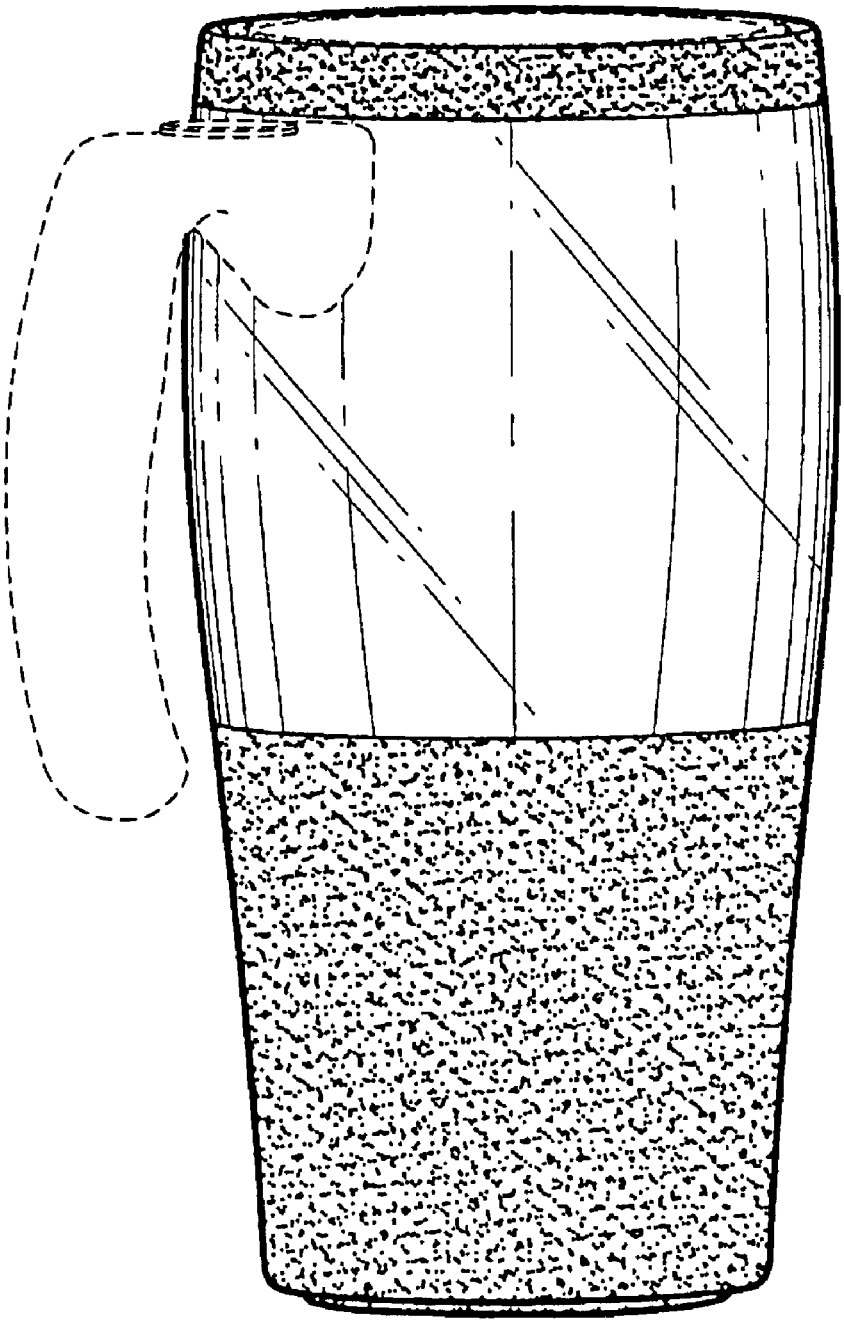
FIG. 1
AMENDED

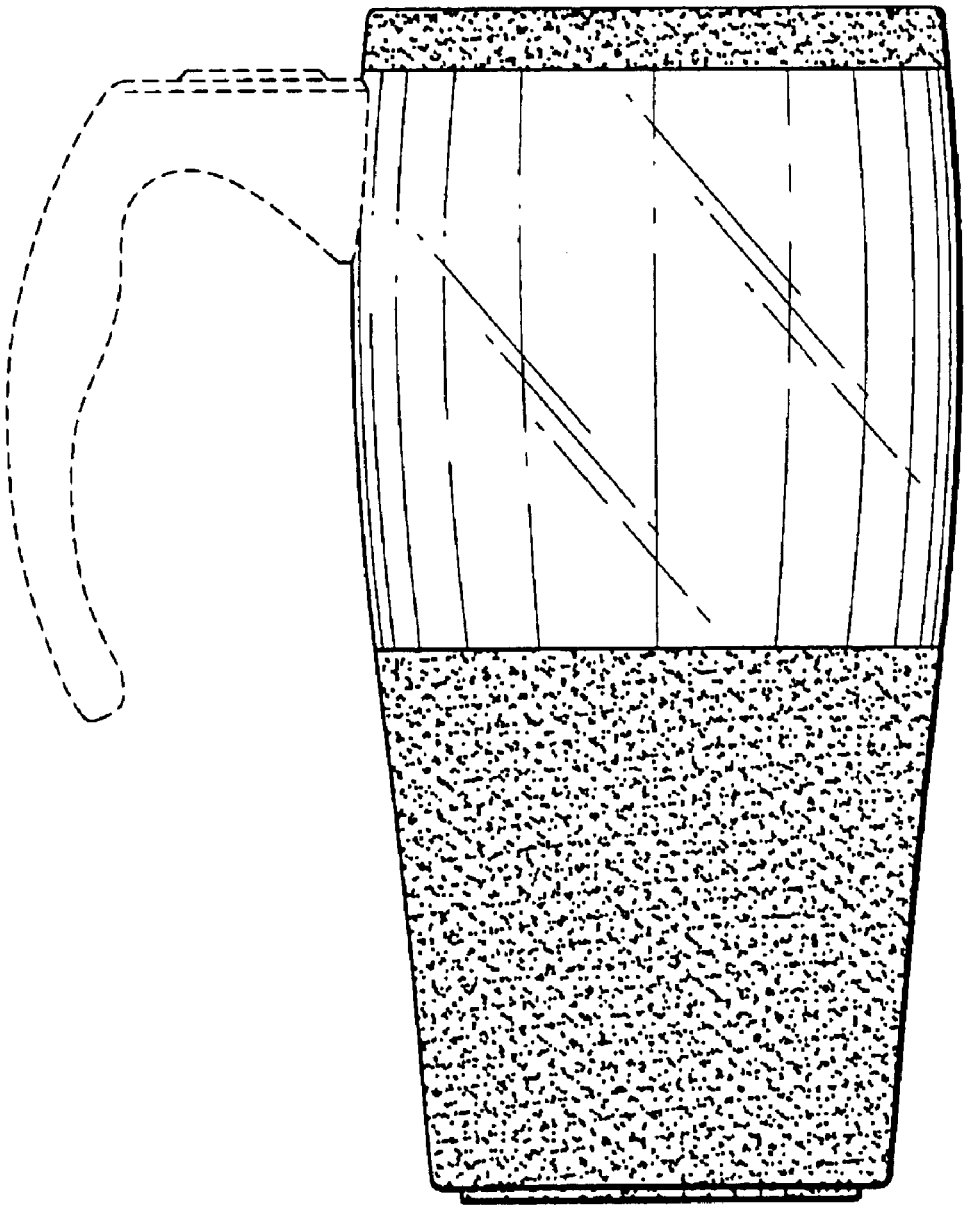
FIG. 2
AMENDED

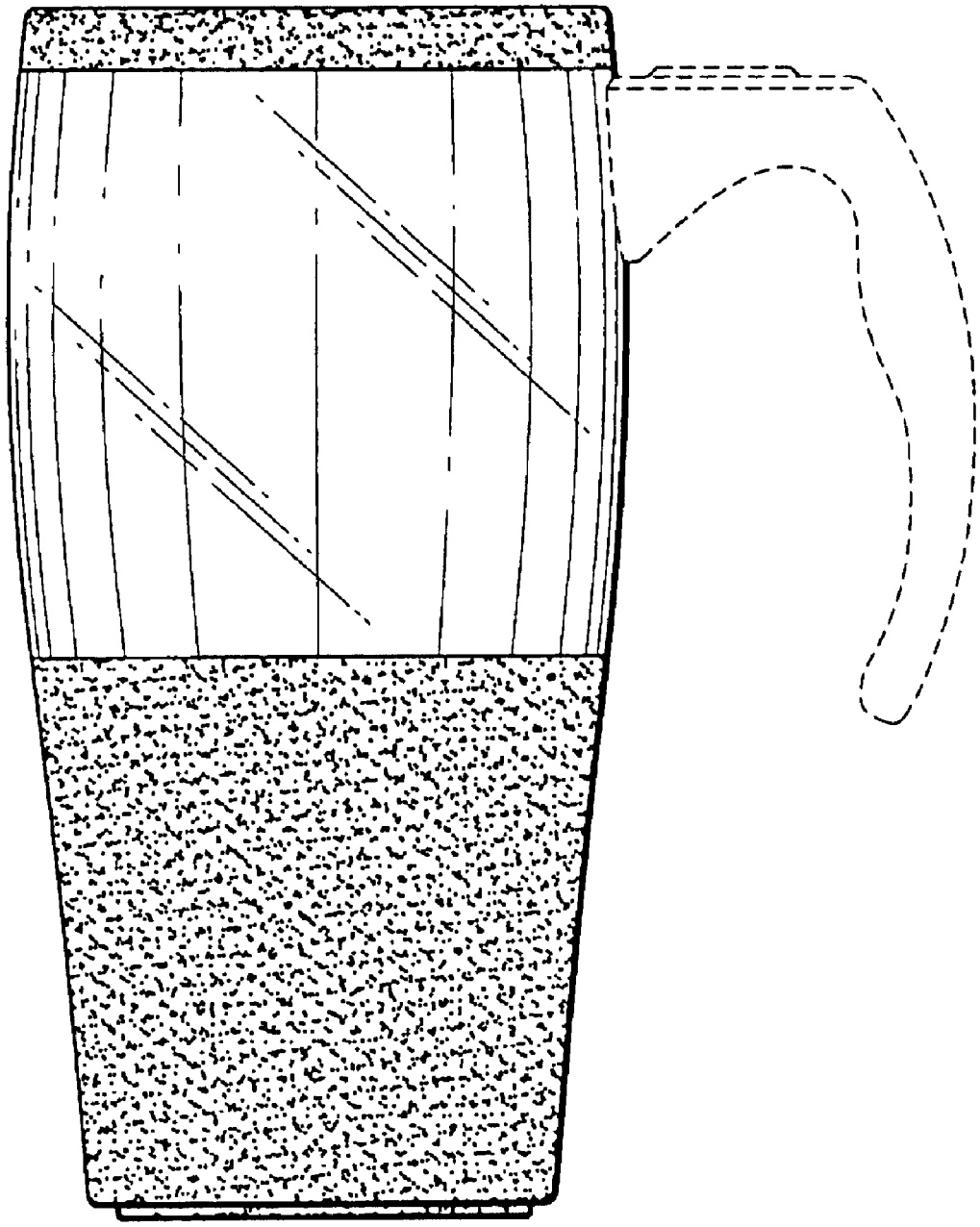
FIG.3
AMENDED

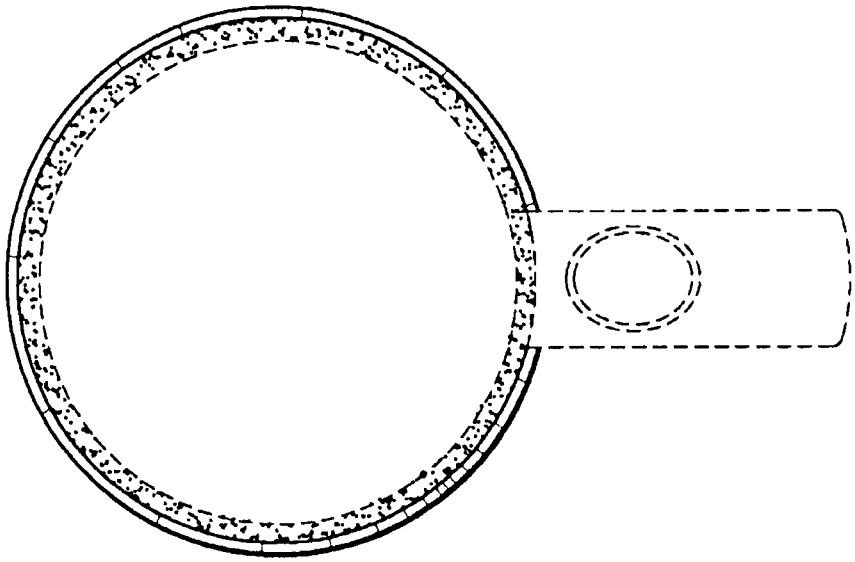
FIG.4
AMENDED
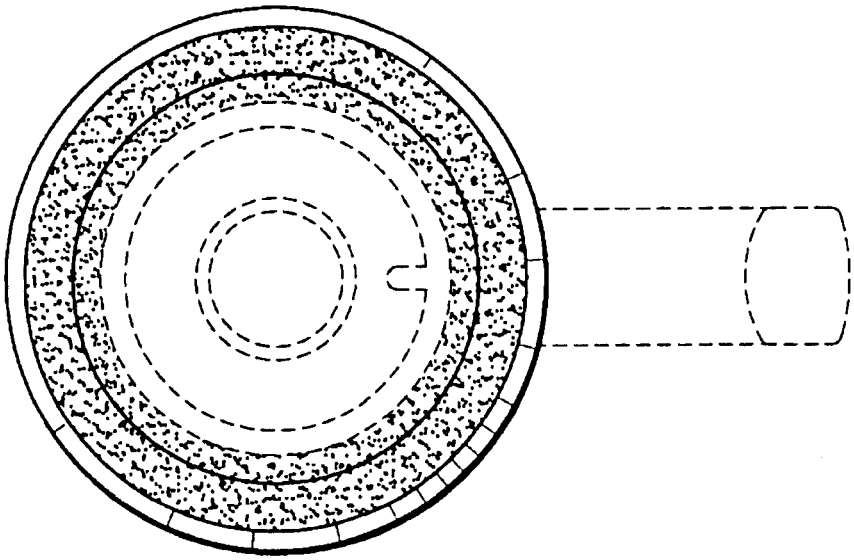
FIG.5
AMENDED

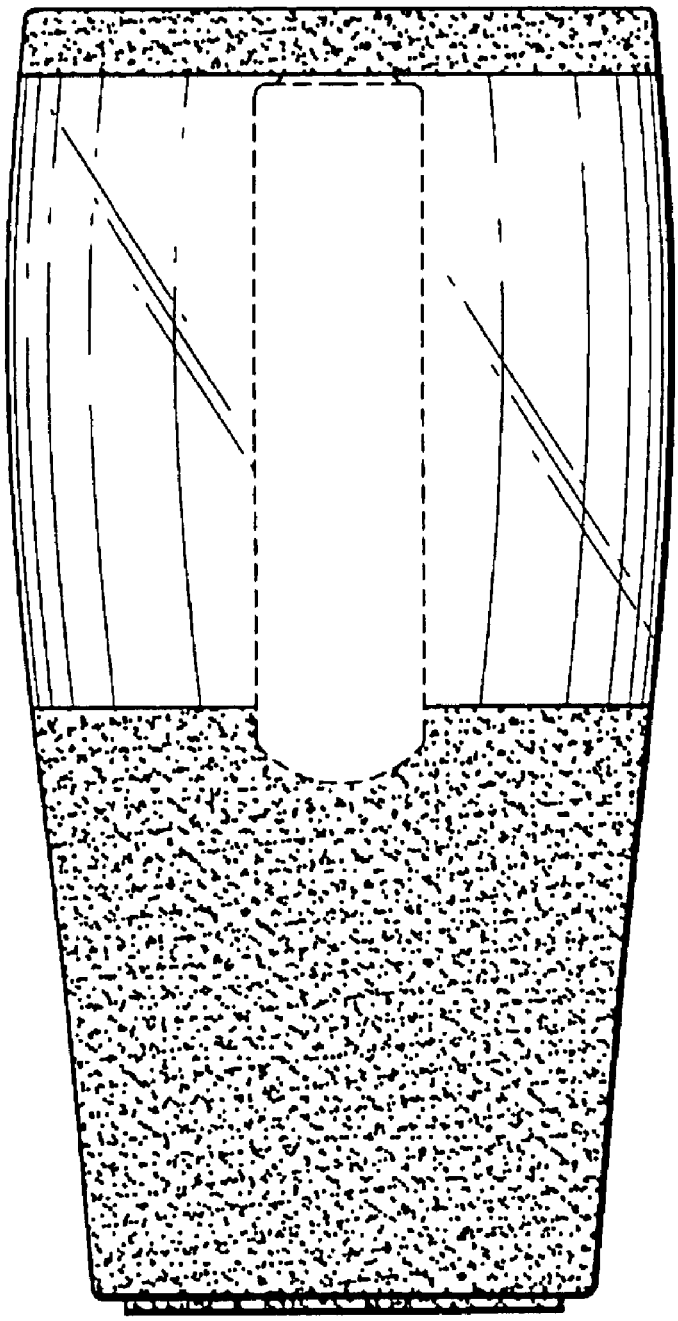
FIG.6
AMENDED

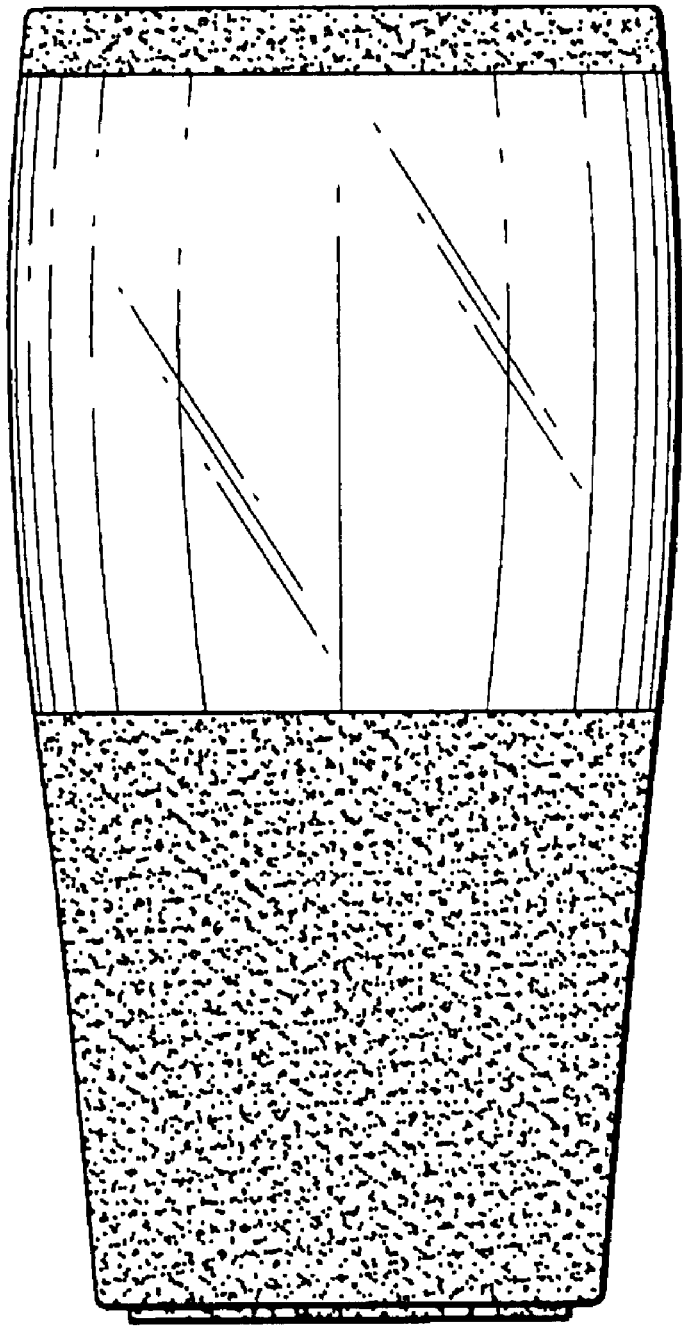
FIG. 7
AMENDED

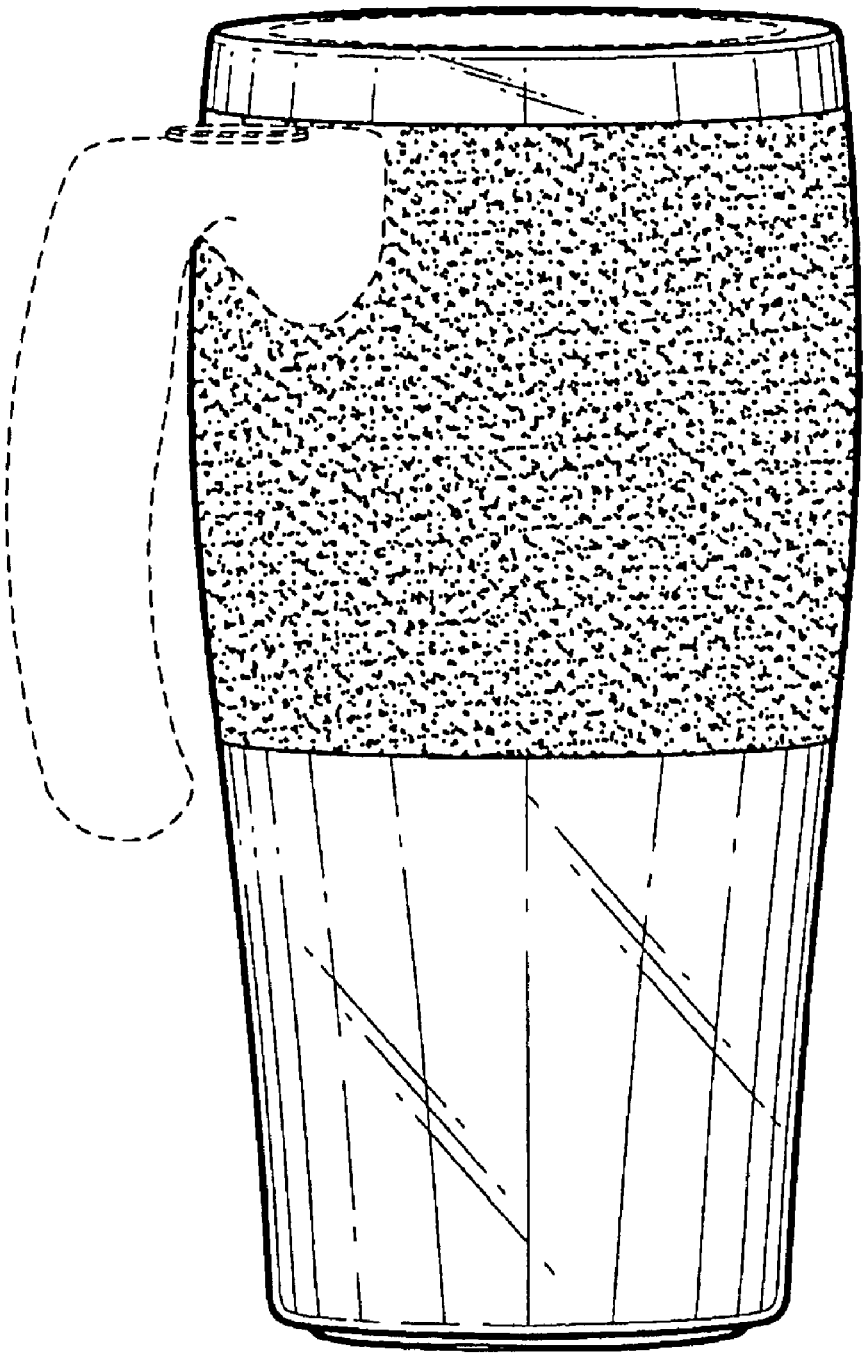
FIG.8
AMENDED

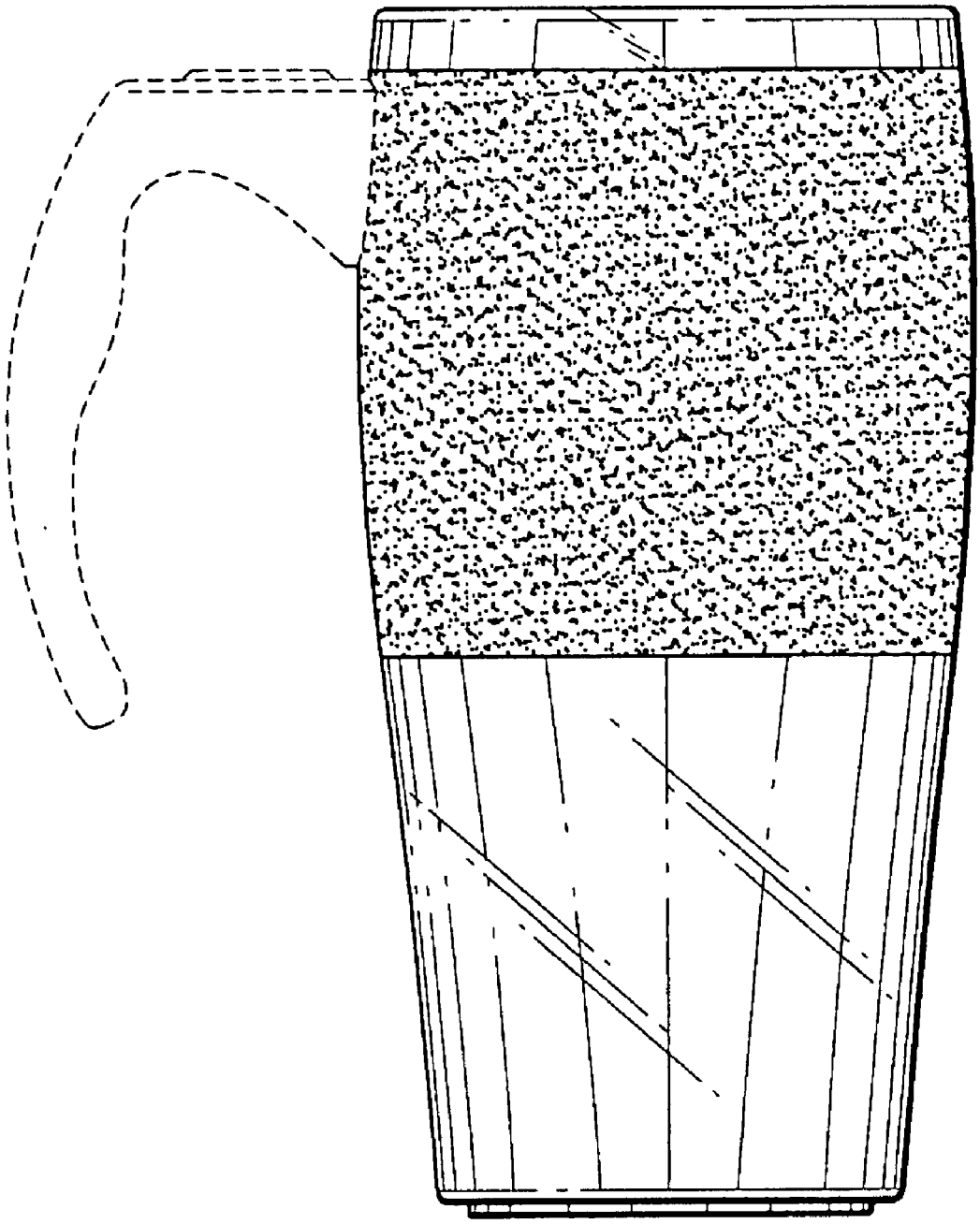
FIG.9
AMENDED

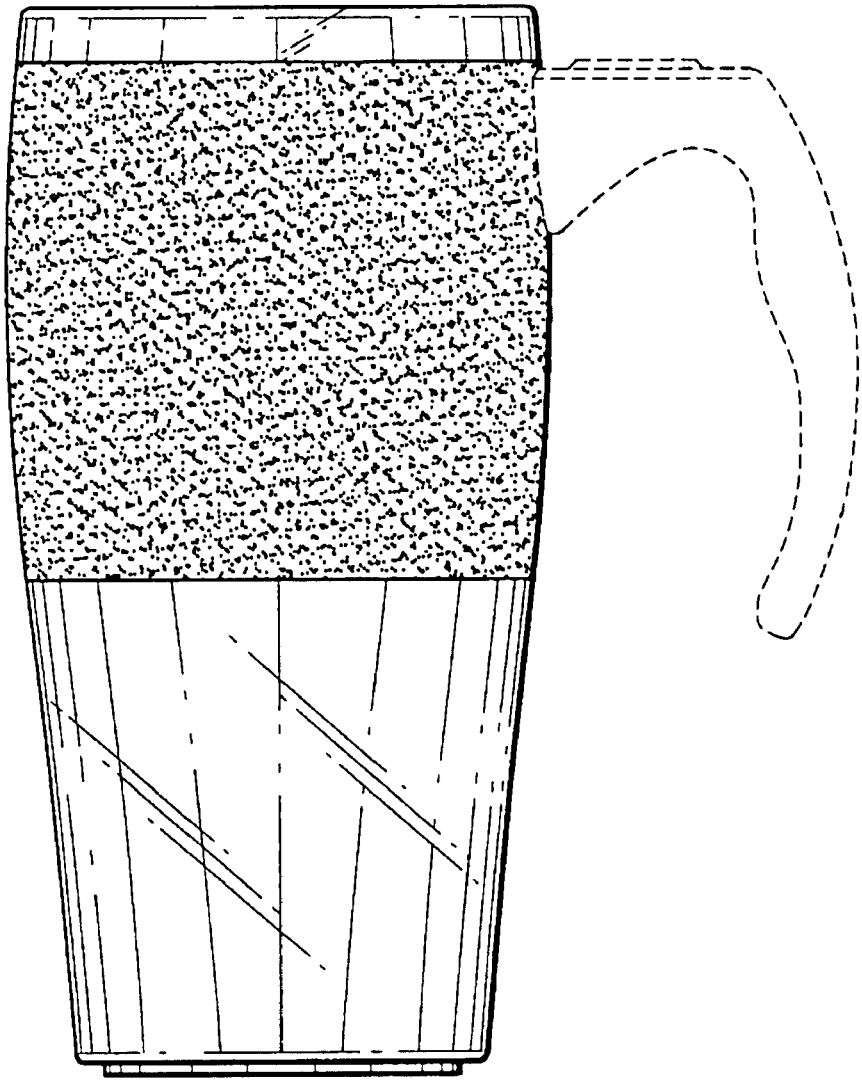
FIG. 10
AMENDED

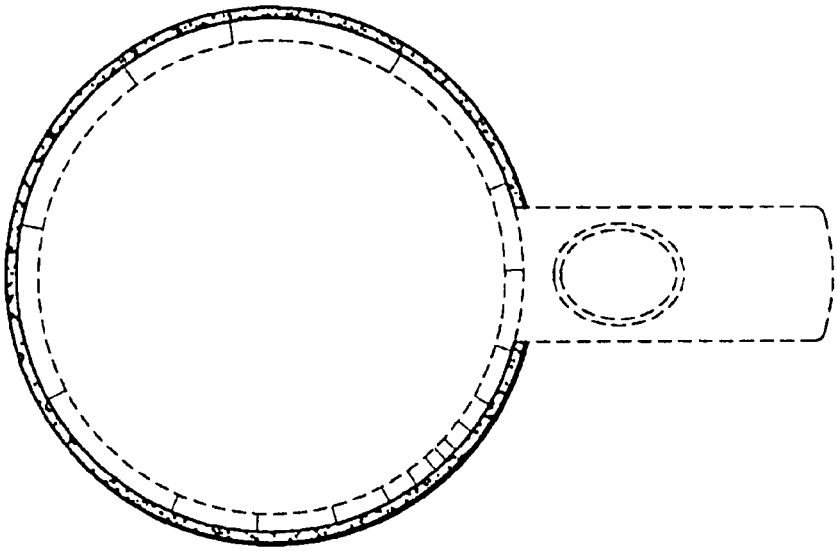
FIG. 11
AMENDED
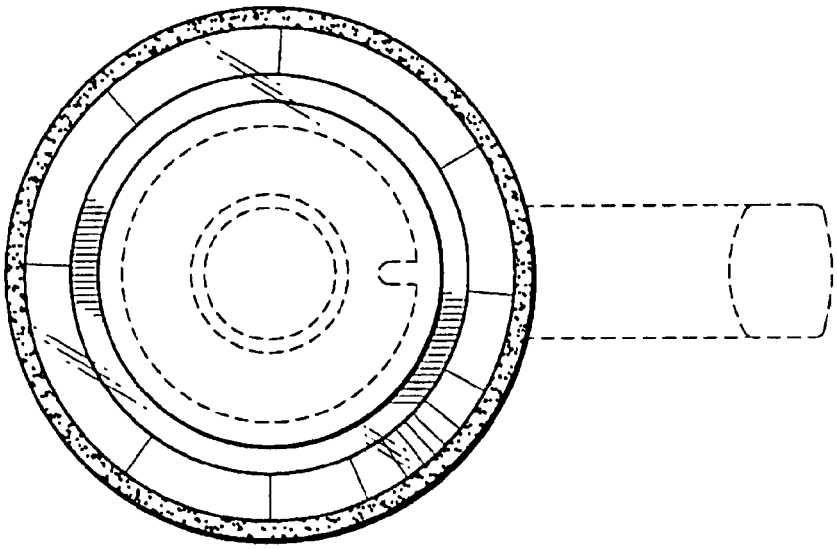
FIG. 12
AMENDED

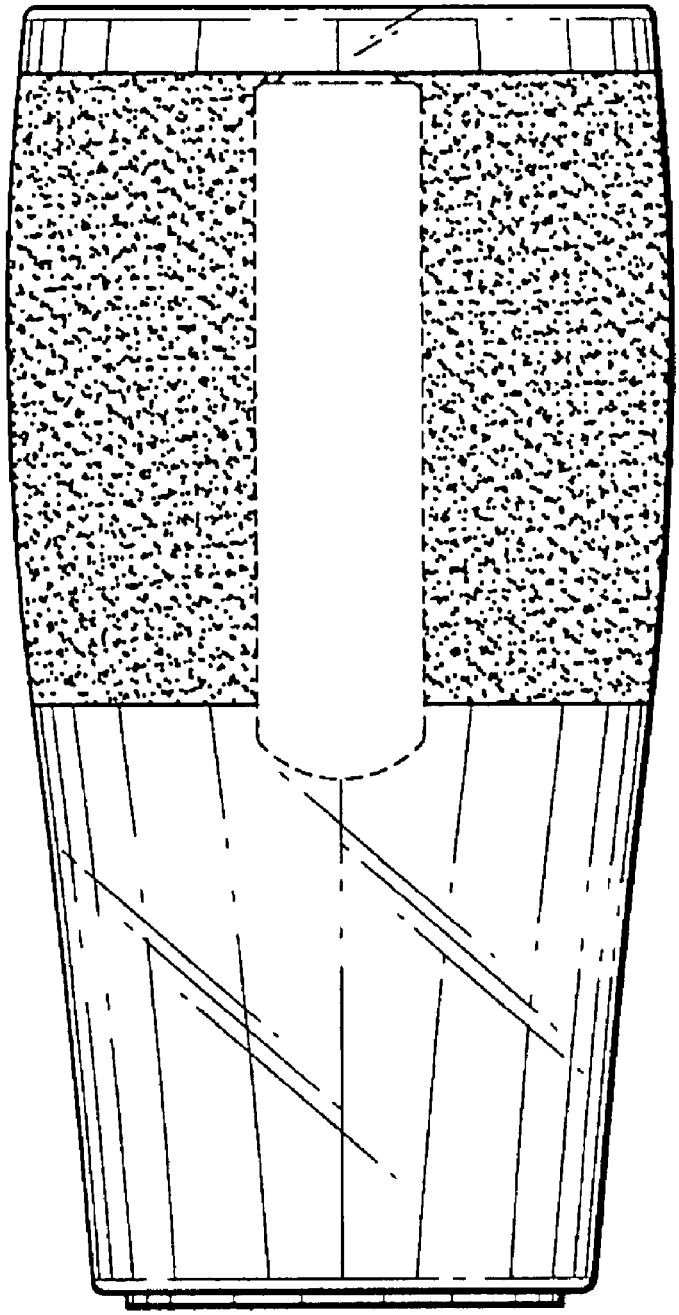
FIG. 13
AMENDED

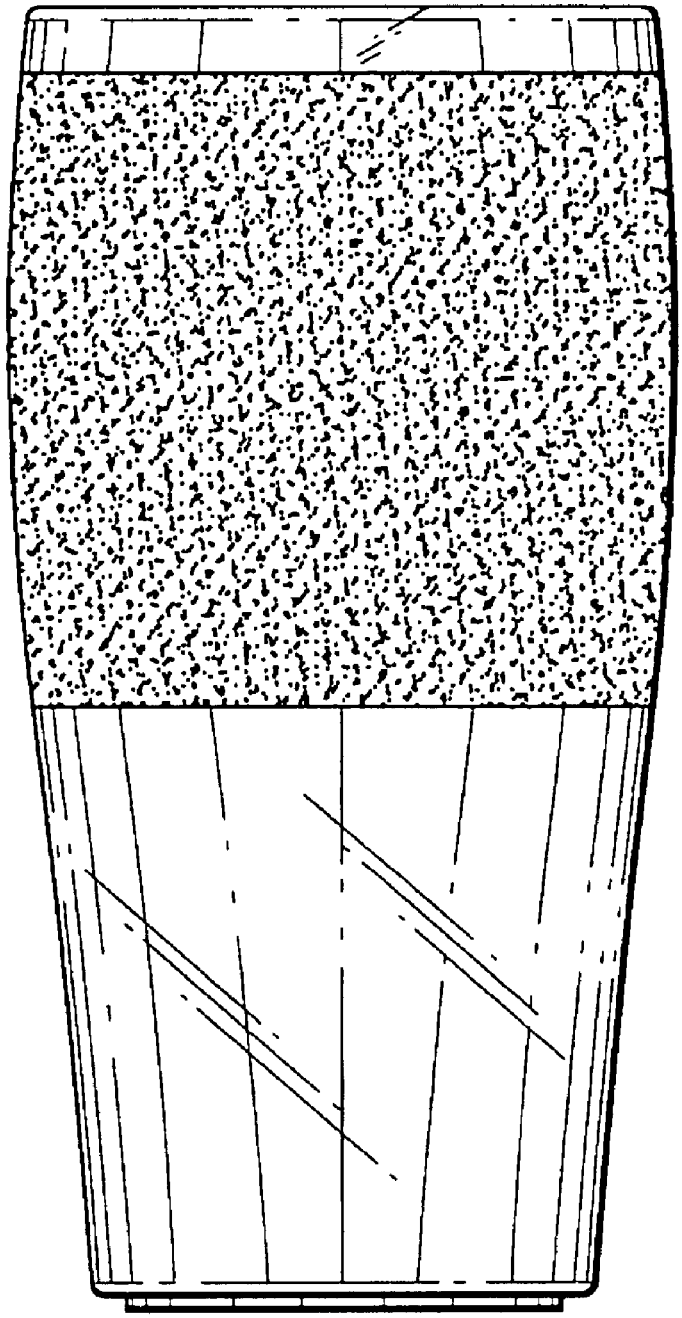
FIG. 14
AMENDED